(12) United States Patent  
Guo et al.

(10) Patent No.: US 9,395,565 B2  
(45) Date of Patent: Jul. 19, 2016

(54) LCD SUBSTRATE AND LCD PANEL

(75) Inventors: Jian Guo, Beijing (CN); Weifeng Zhou, Beijing (CN); Xing Ming, Beijing (CN); Guanghui Xiao, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 664 days.

(21) Appl. No.: 12/878,172

(22) Filed: Sep. 9, 2010

(65) Prior Publication Data

US 2011/0063562 A1 Mar. 17, 2011

(30) Foreign Application Priority Data

Sep. 11, 2009 (CN) .......................... 2009 1 0092557

(51) Int. Cl.  
*G02F 1/133* (2006.01)  
*G02F 1/1333* (2006.01)

(52) U.S. Cl.  
CPC .... *G02F 1/133* (2013.01); *G02F 2001/133394* (2013.01)

(58) Field of Classification Search  
CPC .......................................... G02F 2001/133394  
See application file for complete search history.

(56) References Cited

U.S. PATENT DOCUMENTS

| 2002/0105263 A1* | 8/2002 | Kim ............................... 313/498 |
| 2005/0174336 A1* | 8/2005 | Nakayama et al. ........... 345/173 |
| 2006/0098155 A1* | 5/2006 | Choo et al. .................... 349/187 |
| 2008/0218673 A1* | 9/2008 | Koyama ........................ 349/122 |

FOREIGN PATENT DOCUMENTS

| JP | 2002-258326 A | 9/2002 |
| JP | 2003-271074 A | 9/2003 |
| JP | 2009164333 A * | 7/2009 |

* cited by examiner

*Primary Examiner* — Jessica M Merlin  
(74) *Attorney, Agent, or Firm* — Ladas & Parry LLP

(57) ABSTRACT

A liquid crystal display (LCD) substrate, comprising: at least one pattern region; and a cutting region around the at least one pattern region, wherein a piezoelectric thin film is formed in the cutting region, and each end of the piezoelectric thin film is connected with a lead.

13 Claims, 2 Drawing Sheets

LCD SUBSTRATE AND LCD PANEL

BACKGROUND

Embodiments of the present invention relate to a liquid crystal display (LCD) substrate and a LCD panel.

Thin film transistor liquid crystal displays (TFT-LCDs) have the advantages of small volume, low energy consumption, low radiation, relative lower manufacturing cost and the like, and thus have prevailed in the flat plate display market.

A panel of a TFT-LCD is formed by assembling an array substrate and a color filter substrate together; during the manufacturing process of the TFT-LCD, the entire panel is formed by bonding the array substrate and the color filter substrate together and injecting liquid crystal into the space between the two substrates.

The assembling process has the strict demands not only on the accuracy of the bonding process but also on the uniformity of the pattern sizes between the array substrate and the color filter substrate. If the sizes of the pattern on the two substrate are different from each other, for example, the pattern size on one substrate is larger, the alignment deflection between the pixel structure on the array substrate and the black matrix and the like on the color filter substrate may be generated after the bonding, and thus, problem of light leakage may occur.

It has been found that there are at least the following problems in the conventional manufacturing process of a TFT-LCD.

By taking the manufacture of an array substrate as an example, various thin films, for example, metal or non-metal thin films, such as SiNx (silicon nitride), a-Si (amorphous silicon), N+a-Si (doped amorphous silicon), AlNd (aluminum-neodymium alloy), ITO (indium tin oxide) layer and etc., are required to deposit on a glass substrate; however, the temperature difference between before and after depositing the above mentioned different thin films may lead to the change of intervals in crystal lattices of the thin film, which, in turn, causes the deformation of the glass substrate on which the thin film is formed. Thus, when different thin films are deposited, the glass substrate may generate the different deformation. For example, when an a-Si layer is deposited, the glass substrate may be deformed to expand outward; and when an indium tin oxide (ITO) layer is deposited, the glass substrate may be deformed to contract inward.

As long as the glass substrate of one of the array substrate and the color filter substrate has been subject to deformation, it is very difficult for the pattern on the array substrate and the pattern on the color filter substrate to maintain the strict uniformity, and thus, the alignment deflection is generated easily, which leads to the problem of light leakage.

SUMMARY

An embodiment of the present invention provides a liquid crystal display (LCD) substrate, comprising: at least one pattern region; and a cutting region around the at least one pattern region, wherein a piezoelectric thin film is formed in the cutting region, and each end of the piezoelectric thin film is connected with a lead.

Another embodiment of the present invention provides a LCD panel, comprising a first LCD substrate and a second LCD substrate, wherein the first LCD substrate comprises at least one pattern region and a cutting region around the pattern region thereon, and a piezoelectric thin film are formed in the cutting region of the first LCD substrate, and each end of the piezoelectric thin film is connected with a lead.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Figure 1:
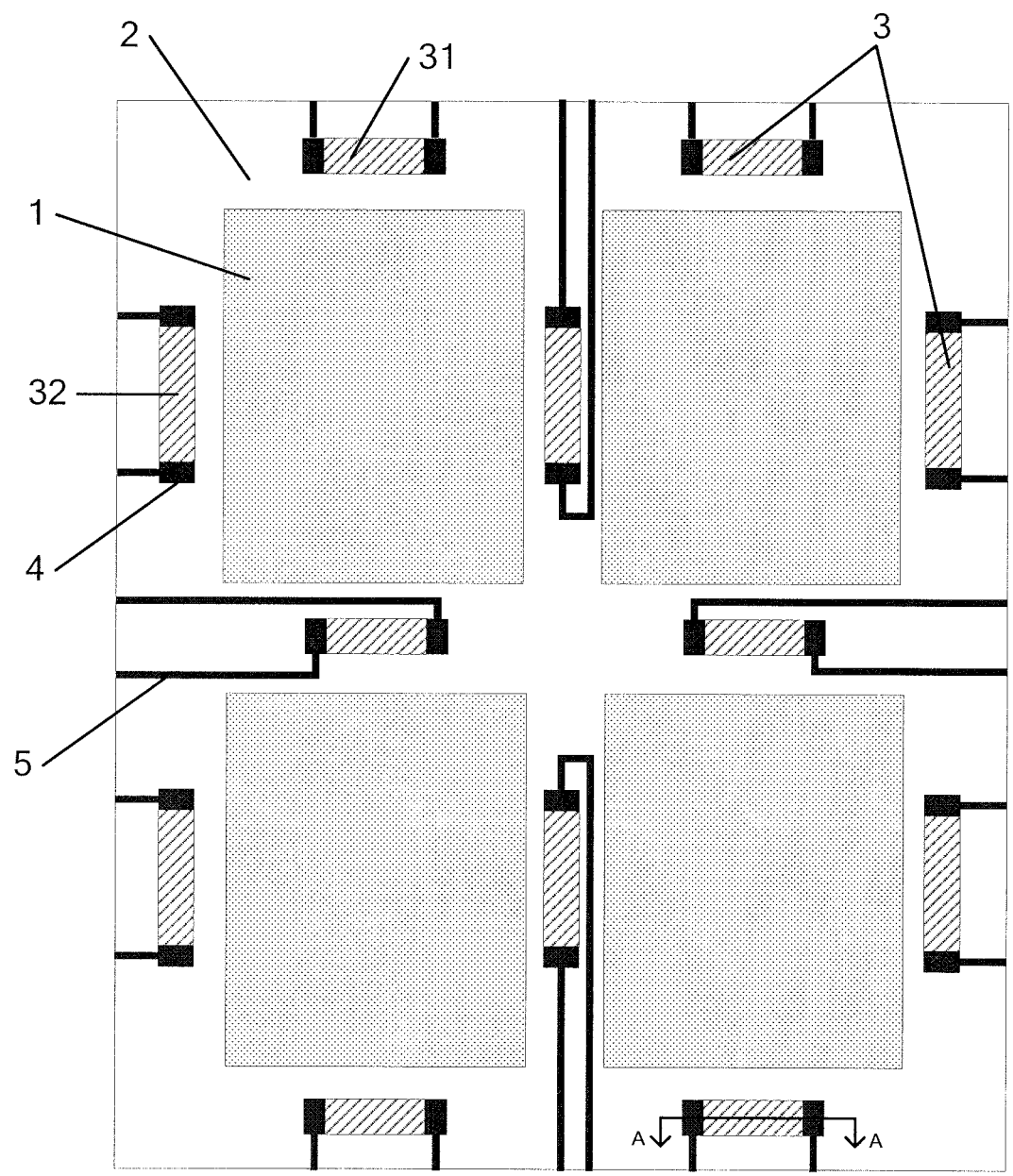
FIG. 1 is a structural schematic view showing a structure of a LCD substrate according to a first embodiment of the present invention.

Hereinafter, with references to the accompanying drawings, a more complete description will be given to the embodiments according to the present invention.

Embodiments of the present invention provide a LCD substrate and a LCD panel capable of correcting the deformation of the LCD substrate, avoiding the alignment deflection of the pattern on the array substrate and the pattern on the color filter substrate.

An embodiment of the present invention provides a LCD substrate, comprising at least one pattern region and a cutting region around the at least one pattern region, wherein a piezoelectric thin film is formed in the cutting region, and each end of the piezoelectric thin film is connected to a lead. Preferably, the lead extends to the periphery of LCD substrate so that the piezoelectric thin film is connected to a power source supply through the lead.

There may be a plurality of piezoelectric thin films formed on the substrate. The piezoelectric thin film each is in a strip shape disposed between two pattern regions or outside of a pattern region; further, the piezoelectric thin films on opposite sides of each pattern region are symmetrically disposed in parallel to each other and have the same length. Thus, around each pattern region the piezoelectric thin films are parallel to the boundary of the pattern region. Once it is found that the LCD substrate has deformation, the substrate may be made to deform by applying a voltage to one piezoelectric thin film or more around the pattern region, and thus the size of the pattern region on the substrate can be adjusted. Moreover, because the piezoelectric thin films on opposite sides of each pattern region have the same length and are disposed symmetrically, the magnitude of the stress imposed on opposite sides of the pattern region is identical in the same direction, and thus, the uniformity of the deformation of the pattern region can be ensured.

In the embodiments of the present invention, the LCD substrate may be an array substrate, and the pattern region on the LCD substrate comprises an effective display region in which a thin film transistor (TFT) array is disposed and a lead region in which a control circuit is disposed. Or, the LCD substrate may be a color filter substrate, and the pattern region on the LCD substrate comprises a region coated with a photoresist and a black matrix.

In a LCD substrate provided by an embodiment of the present invention, by arranging a piezoelectric thin film in the cutting region outside of the pattern region and by using the reverse piezoelectric effect that the piezoelectric thin film deforms under an outer electric field, the deformation of the piezoelectric thin film can be controlled, which, in turn, may cause the deformation of the LCD substrate to which the piezoelectric thin film is attached. Further, when the LCD substrate deforms, which influences on the accurate alignment of the pattern on the array substrate and the pattern on the color filter substrate during the assembling process, the deformation degrees of a plurality of piezoelectric thin films can be controlled by applying different voltages thereto, and in turn, the deformation of the LCD substrate to which the piezoelectric thin films are attached may be corrected.

Hereinafter, the LCD substrate according to embodiments of the present invention will be described in detail in connection with the accompanying drawings.

Embodiment 1

As an example, a piezoelectric thin film is disposed on an array substrate. In connection with FIG. 1, a LCD substrate of the present embodiment comprises four pattern regions 1 and a cutting region 2 around the pattern regions 1 thereon. Piezoelectric thin films 3 are formed in the cutting region 2, and each end of the piezoelectric thin films 3 is connected with a lead, and the leads extend to the periphery of the LCD substrate and are connected to a power source supply.

In order to ensure the excellent electrical contact between one end of the piezoelectric thin film 3 and the lead, each end of the piezoelectric thin films 3 is preferably provided with an electricity supply electrode 4 and the lead is then connected to the electricity supply electrode 4.

The above mentioned piezoelectric thin films are in a strip shape and disposed between two pattern regions 1 or outside of the pattern regions 1. Further, the piezoelectric thin films 3 on opposite sides of each pattern region 1 are symmetrically disposed in parallel to each other and have the same length. From FIG. 1, it can be seen that the piezoelectric thin films 3 comprise piezoelectric thin films arranged in a transverse direction and piezoelectric thin films arranged in a longitudinal direction. The transverse piezoelectric thin films in the same column are parallel to each other and have the same length, and the longitudinal piezoelectric thin films in the same row are parallel to each other and have the same length.

With reference to FIG. 1, if there are M×N (M rows, N columns) pattern regions 1 disposed on the LCD substrate, M+1 rows of transverse piezoelectric thin films 31 and N+1 columns of longitudinal piezoelectric thin films 32 are formed on the LCD substrate. Every row of the transverse piezoelectric thin films comprise N transverse piezoelectric thin films 31 having the same length, and every column of the longitudinal piezoelectric thin films comprise M longitudinal piezoelectric thin films 32 having the same length. Therefore, the magnitude of the stress imposed on opposite sides of each of the pattern region 1 may be identical in the same direction, and thus, the uniformity of the deformation of the pattern region 1 may be ensured.

In the present embodiment, each of the pattern region 1 is provided with one piezoelectric thin film 3 of a strip shape on each of opposite sides thereof, and the electricity supply electrode 4 on each end of the piezoelectric thin film 3 is connected to an outer power source through a lead 5; preferably, the lead 5 may be a metal lead disposed in the same layer as a gate line on the array substrate, and may be also a combination of the metal lead and a ITO lead, and the ITO lead here is disposed in the same layer as a ITO pixel electrode of the pattern region and the ITO lead is connected to the metal lead through a via hole formed in an insulating layer. The leads of each pattern region may be extended to the periphery of the LCD substrate to be collected, for conveniently connecting to the outer power source. Thus, when there is a need to control the deformation of the pattern region, the deformation degree of the piezoelectric thin film 3 can be adjusted by changing the voltage value supplied from the outer power source, that is, the deformation degree of the pattern region 1 can be controlled by changing the voltage value supplied from the outer power source.

Figure 2:
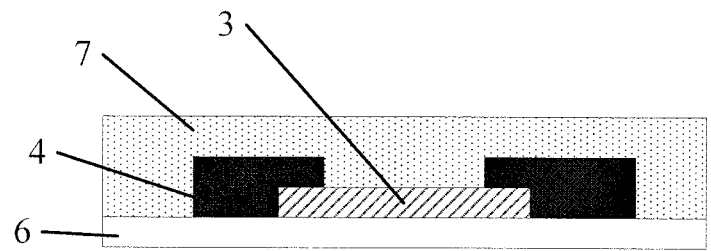
FIG. 2 is a sectional view taken along line A-A of the piezoelectric thin film of FIG. 1.

With reference to FIG. 2, with respect to the LCD substrate provided by the present embodiment, and in the process of manufacturing the LCD substrate, firstly, a layer of piezoelectric thin film material is deposited on a glass substrate 6, and then the piezoelectric thin film 3 is formed into a strip shape by a patterning process. During the deposition of the piezoelectric thin film material, in order to prevent the TFT-LCD substrate from being disturbed by the step difference phenomenon (the height difference of the surface topography of the substrate), the thickness of the piezoelectric thin film 3 is preferably relative thinner; in the present embodiment, the thickness of the piezoelectric thin film 3 may be in a range of between 1000 Å and 4000 Å. The shape of the piezoelectric thin film may be adjusted as necessary, and the length thereof may be made to be relative smaller, such as, several tens micron, or may be made to be slightly smaller than the length or the width of one pattern region.

Subsequently, a layer of gate line thin film is deposited, and then by a patterning process, gate lines, common electrode lines and the like located in the pattern region are formed along with the electricity supply electrodes 4 and the leads 5 in the cutting region. Each electricity supply electrode 4 is located on a corresponding end of a piezoelectric thin film 3 and tightly connected with the piezoelectric thin film 3, and one lead 5 is connected with the electricity supply electrode 4. Here, the electricity supply electrode 4 is of the shape shown in FIG. 2, but not limited to such shape, and other shapes are applicable as long as the excellent contact is ensured between the electricity supply electrode 4 and the piezoelectric thin film 3. One electricity supply electrode 4 is located on each end of the piezoelectric thin film 3, and when a voltage is applied across the piezoelectric thin film 3, the piezoelectric thin film 3 deforms along the direction of the applied voltage due to the reverse piezoelectric effect, and in turn, the glass substrate therebelow is made to deform. In addition, it is preferable for the all leads 5 to extend up to the edge of the glass substrate in order to conveniently control the leads corresponding to a plurality of piezoelectric thin films 3 as a whole.

After an insulating layer 7 is deposited, a via hole is formed in the insulating layer 7 at the position of each electrode lead 5. Then, an ITO material is deposited on the substrate, and then, ITO leads are formed by the patterning process, and one end of each ITO lead is connected to one lead 5 located in the gate line layer through one via hole in the insulating film 7, and the other end thereof is connected to an outer power source. During the assembling process, a voltage signal may be conveniently transferred to the electricity supply electrodes on both ends of the piezoelectric thin film, and thus, the control signal can be applied to the piezoelectric thin film.

A patterning process in the embodiment of the invention can comprise applying of photoresist, exposing and developing of photoresist, etching with a photoresist pattern, and removing remaining photoresist and the like.

The above mentioned process for manufacturing the LCD substrate is mere one example of the present embodiment. For example, in practice, it is possible for the electricity supply electrode 4 and the lead 5 to be individually formed by using other conductive material other than the gate line metal material, and at this time, one additional step is needed to form the electricity supply electrode 4 and the lead 5.

Again, for example, in order to avoid the etching solutions for the gate line material layer interacting with the piezoelectric thin films 3 during the forming process of the electricity supply electrode 4, the processes may be accordingly adjusted. After the piezoelectric thin films 3 are formed, an insulating layer 7 is deposited thereon; then, via holes are formed at the positions of the ends of the piezoelectric thin films 3 by using a dry etching process; subsequently, the electricity supply electrodes 4 are formed at the positions of the via holes, and leads connected with the electricity supply electrodes 4 are formed so that electricity supply electrodes 4 can be connected to an outer power source and thus, the applied voltage can be controlled.

After the assembling process is completed, the color filter substrate and the array substrate are attached together by using a sealant and then the sealant is hardened, and finally, the two substrates with matched shapes after the adjustment are assembled together. The piezoelectric thin films located in the cutting region are removed in a cutting process.

In the present embodiment, the piezoelectric thin films are for example formed on the array substrate. However, the embodiment of the present invention is applicable not only to the array substrate but also to the color filter substrate. Because there is no insulating layer on the color filter substrate, it is difficult to use a combination of a metal lead and an ITO lead located in the different layers to obtain the lead, through which a power source is connected with the electricity supply electrodes. Therefore, in the case of the color filter substrate, the metal lead may be utilized only.

In the LCD substrate provided by the embodiment of the present invention, by arranging the piezoelectric thin films in the cutting region outside of the pattern regions and by using the reverse piezoelectric effect that the piezoelectric thin film deforms under an applied outer electric field, the deformation of the piezoelectric thin films can be controlled, which, in turn, may cause the deformation of the LCD substrate to which the piezoelectric thin films are attached. Thus, when the LCD substrate to which the piezoelectric thin films are attached deform, which influences on the accurate alignment of the pattern on the array substrate and the pattern on the color filter substrate, the deformation degrees of the piezoelectric thin films can be controlled by applied different voltages thereto, and in turn, the deformation of the LCD substrate can be corrected.

Embodiment 2

Figure 3:
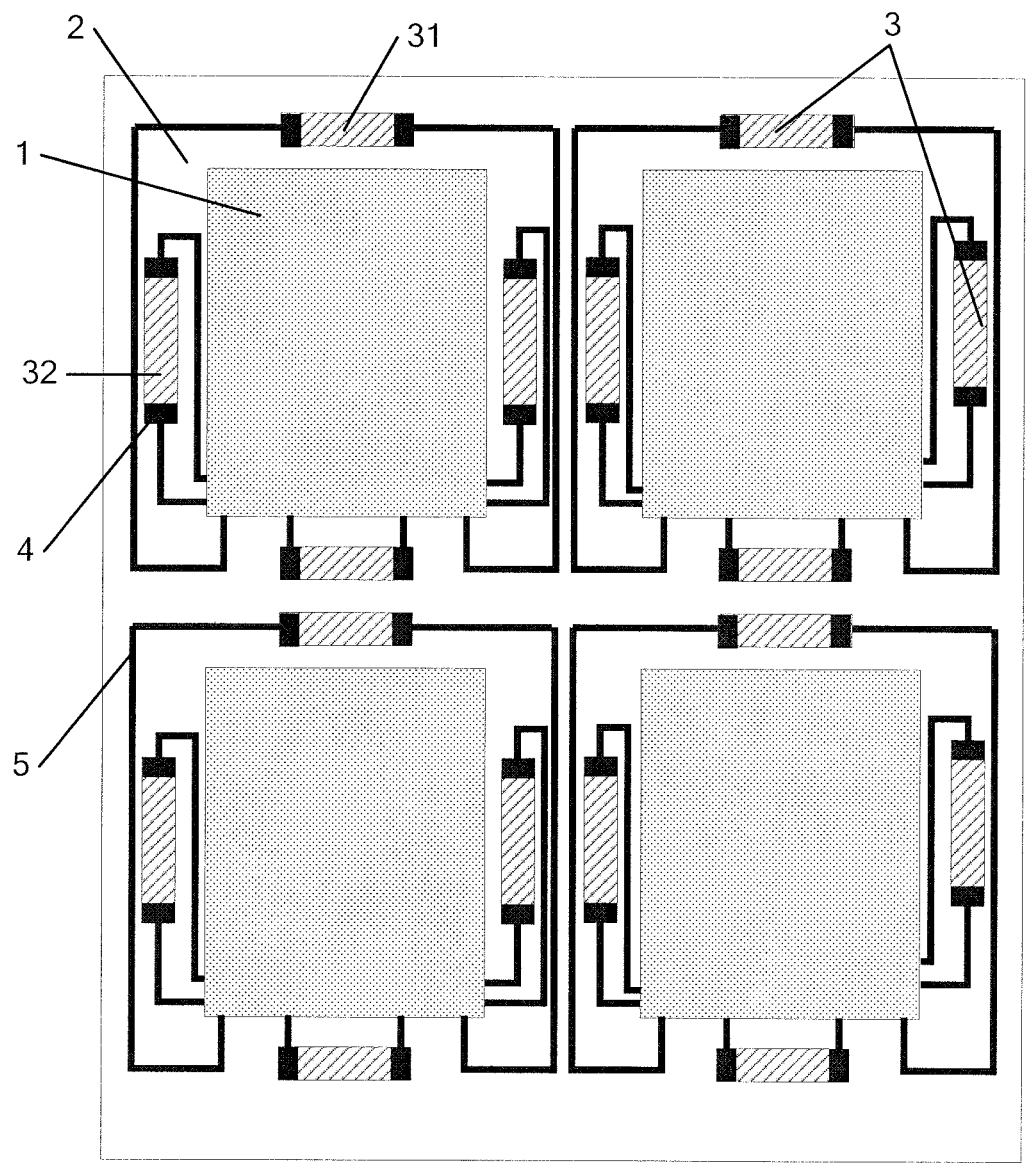
FIG. 3 is a structural schematic view showing a structure of a LCD substrate according to a second embodiment of the present invention.

In consideration of the deformation instability of a substrate, the following modification may be made with respect to the LCD substrate in the first embodiment (an array substrate is still taken as an example): as shown in FIG. 3, two parallel piezoelectric thin films 3 of a strip shape are disposed between two pattern regions 1 on the LCD substrate; further, electricity supply electrodes 4 on both ends of the piezoelectric thin film 3 are connected to a control circuit (not shown) located in the corresponding pattern region 1 through leads 5. Specifically, the leads 5 may be metal leads disposed in the same layer as the gate lines, and each may be also a combination of a metal lead and an ITO lead, and the ITO lead here is disposed in the same layer as an ITO pixel electrode of the pattern region and the ITO lead is connected to the metal lead through a via hole formed in an insulating layer.

In connection with FIG. 3, if there are totally M×N (M rows, N columns) pattern regions 1 formed on the LCD substrate, 2*M rows of transverse piezoelectric thin films 31 and 2*N columns of longitudinal piezoelectric thin films 32 are formed on the LCD substrate. Each row of the transverse piezoelectric thin films comprise N transverse piezoelectric thin films 31 having the same length, and each column of the longitudinal piezoelectric thin films comprises M longitudinal piezoelectric thin films 32 having the same length.

In the arrange manner of the leads of the above mentioned structure, the control voltage across each piezoelectric thin film 3 of the first embodiment may be instead supplied by the control circuit on the array substrate. Thus, a voltage is applied across each piezoelectric thin film 3 by the control circuit of the array substrate, and in turn, the deformation of the piezoelectric thin film and the deformation of the array substrate may be controlled.

In the case of the above mentioned structure, when the process for cutting the array substrate is performed, the substrate can be cut along a middle portion between two adjacent parallel piezoelectric thin films 3 of a strip shape located between two pattern regions 1, and thus, the two adjacent piezoelectric thin films 3 separated and allocated to the two individual array substrate, respectively.

Accordingly, after the color filter substrate and the array substrate are attached by forming a sealant element and then the sealant element is hardened, the piezoelectric thin films 3, an effective display region of the array substrate and the leads are within the sealed range of the sealant element. At this time, if it is found that the alignment deflection still occurs between pattern on the color filter substrate and patterns on the array substrate, a voltage can be applied across each piezoelectric thin film 3 by the control circuit on the array substrate so as to make the piezoelectric thin film 3 deform, and in turn, the array substrate can be made to simultaneously deform, and thus, a problem that the pattern on the color filter substrate mismatches the pattern on the array substrate can be solved. Because the control may be performed by using the control circuit on the array substrate, if there is still misalignment in the LCD panel after the cutting process, the piezoelectric thin films can be still applied with a voltage by the control circuit on the array substrate to make the piezoelectric thin film deform, and thus, the problem of the patter mismatch can be solved.

With such structure, the sealant element used in the assembling process can be softer than the typically used sealant element so as to adapt to the change of the shape of the glass substrate, while the breakage thereof may not occur.

In the present embodiment, the piezoelectric thin film only formed on the array substrate is taken as an example. Practically, the embodiment of the present invention is applicable not only to the array substrate but also to the color filter substrate; both ends of each piezoelectric thin film formed on the color filter substrate can be likely supplied with a voltage by the control circuit provided on the array substrate. In this case, the piezoelectric thin film on the color filter substrate is in electrical connection with the control circuit on the array substrate by means of leads or like.

In the LCD substrate provided in the embodiment of the present invention, by arranging the piezoelectric thin films in the cutting region outside of the pattern region and by using the reverse piezoelectric effect that the piezoelectric thin films deform under an outer electric field, the deformation of the piezoelectric thin films may be controlled, which, in turn, may cause the deformation of the LCD substrate to which the piezoelectric thin films are attached. Thus, when the LCD substrate to which the piezoelectric thin films are attached deforms, which influences on the accurate alignment of the pattern on the array substrate and the pattern on the color filter substrate, the deformation degrees of different piezoelectric thin films can be controlled by applying different voltages, and in turn, the deformation of the LCD substrate may be corrected. Further, in the present embodiment, the piezoelectric thin films are disposed within the sealed range of the sealant element, so that the piezoelectric thin films and the pattern region are formed into an integrate structure. Thus, with respect to the unit LCD substrate after the cutting process, once it is found that the light leakage occurs due to the misalignment of the patterns, the deformation of the LCD substrate can be controlled by applying voltages to the piezoelectric thin films so that the problem of the alignment deflection can be corrected.

Embodiment 3

In the present embodiment, there is provided a LCD panel, comprising a first LCD substrate and a second LCD substrate, and the first LCD substrate and the second LCD substrate correspondingly comprise at least one pattern region and a cutting region around the at least one pattern region thereon. A piezoelectric thin film is formed in the cutting region of the first LCD substrate and/or the second LCD substrate, and both ends of the piezoelectric thin film are connected with leads and the piezoelectric thin film is connected to a power source supply through the leads.

In order to ensure the excellent electrical contact between the piezoelectric thin film and the leads, each end of the piezoelectric thin film can further provided with an electricity supply electrode and one lead is then connected to the electricity supply electrode.

In the present embodiment, the first LCD substrate and the second LCD substrate may be the color filter substrate and the array substrate, respectively, and thus, a pattern region on the first LCD substrate comprises a region coated with a photoresist and a black matrix, and a pattern region on the second LCD substrate comprises an effective display region in which TFTs are disposed and a lead region provided with a control circuit.

The array substrate or the color filter substrate has a piezoelectric thin film formed thereon, or both of the array substrate and the color filter substrate have piezoelectric thin films formed thereon. As long as the mismatch of the pattern size occurs between the array substrate and the color filter substrate, the piezoelectric thin film(s) on one or both of the two substrates may be controlled to deform by applying a voltage thereto, and thus, the problem of the pattern mismatch may be corrected.

Specifically, the way to dispose the piezoelectric thin films on the array substrate or the color filter substrate can performed as described in the first embodiment or the second embodiment.

During the process for assembling the LCD panel, when the shape of the color filter substrate mismatches with the shape of the array substrate due to their respective reasons, for example, the size of the pattern on the color filter substrate entirely expands by x μm in a transverse direction as compared with that of the array substrate, if the assembling process is directly performed, the pattern mismatch occurs between the color filter substrate and the array substrate, and thus, the light leakage and the like may occur. With respect to this case, a voltage may be applied to the transverse piezoelectric thin films on the array substrate so as to make the array substrate expand by x μm in the transverse direction, or a voltage may be applied to the transverse piezoelectric thin films on the color filter substrate so as to make the color filter substrate contract by x μm in the transverse direction, so that the shape of the pattern on the color filter substrate can match the shape of the pattern on the array substrate.

In the LCD panel provided by the present embodiment, by arranging the piezoelectric thin films in the cutting region outside of the pattern region and by using the reverse piezoelectric effect that each piezoelectric thin film deforms under an outer electric field, the deformation of the piezoelectric thin film can be controlled, which, in turn, may cause the deformation of the LCD substrate to which the piezoelectric thin film is attached. Thus, when the substrate to which the piezoelectric thin film is attached deforms, which may influence on the accurate alignment of the pattern on the array substrate and the pattern on the color filter substrate during the assembling process, the deformation degrees of different piezoelectric thin films can be controlled by applying different voltages, and in turn, the deformation of the substrate to which the piezoelectric thin films are attached may be corrected.

Of course, the piezoelectric thin film in embodiments of the present invention can be disposed only outside of all pattern regions. Also, each piezoelectric thin film may not be corresponds to only one single pattern region. For example, all pattern regions may be provided with two parallel piezoelectric thin films of a strip shape arranged along a transverse direction and having the same length on top side and bottom side thereof, and all pattern regions may be provided with two parallel piezoelectric thin films of a strip shape arranged along a longitudinal direction and having the same length on right side and left side thereof. Thus, once it is found that the LCD substrate has deformation, by applying a voltage to each piezoelectric thin film arranged along a transverse and/or longitudinal direction outside all pattern regions, the LCD substrate can be made to entirely deform, and thus the size of the pattern region may be adjusted. In this case, the length of the piezoelectric thin film may be equal to or slightly less than the length or the width of the LCD substrate. Alternatively, the piezoelectric thin films may be formed in the entire LCD substrate in a symmetrical manner, for example, in a cross-shape manner, as long as the deformation of the substrate may be uniformly controlled.

The material for the piezoelectric thin film used in the LCD substrate and the LCD panel may be piezoelectric crystal, piezoelectric ceramic or organic piezoelectric material. For example, the piezoelectric ceramic is selected as the piezoelectric thin film material.

With regarding to the piezoelectric ceramic, the material for the piezoelectric ceramic may be classified into many types, such as, amorphous silicon composite thin film (composite comprising amorphous silicon and piezoelectric ceramic, such as, $BaTiO_3$ and the like). After a voltage is applied, the piezoelectric ceramic thin film can have the largest deformation amount of 5%. When a length of the piezoelectric ceramic thin film is larger than 100 μm, depending on the different applied voltage (5~30V), the largest deformation amount can be up to 5 μm. When the length of the piezoelectric ceramic thin film is close to a size of liquid crystal screen, for example, the length of the thin film is 20 cm, the deformation amount may be close to centimeter-sized. With respect to the LCD substrate only having the deformation amount of several microns, the above mentioned piezoelectric ceramic thin film can meet the requirement.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display (LCD) substrate, comprising:
a base substrate;
at least one pattern region; and
a cutting region around the at least one pattern region,
wherein a piezoelectric thin film is formed in the cutting region and formed on the base substrate, and each end of the piezoelectric thin film is connected with a lead,
wherein a thickness of the piezoelectric thin film is in a range of between 1000 Å and 4000 Å,
wherein the lead is a metal lead disposed in the same layer as a gate line of the LCD substrate; or
wherein the lead is a combination of a metal lead disposed in the same layer as a gate line of the LCD substrate and an ITO lead, and the ITO lead is disposed in the same layer as an ITO pixel electrode of the pattern region and the ITO lead is connected to the metal lead through a via hole,
wherein the metal lead and the gate line of the LCD substrate are formed on the base substrate on which the piezoelectric thin film is formed, the piezoelectric thin film is formed through a patterning process.

2. The LCD substrate of claim 1, comprising a plurality of piezoelectric thin films, which are disposed on opposite sides of the at least one pattern region.

3. The LCD substrate of claim 1, wherein the lead connected to each end of the piezoelectric thin film extends to the periphery of the LCD substrate.

4. The LCD substrate of claim 1, wherein the piezoelectric thin film is provided with an electricity supply electrode on each end thereof, and the lead is connected to the piezoelectric thin film through the electricity supply electrode.

5. The LCD substrate of claim 1, wherein the lead is selected from a group consisting of a metal lead and a combination of the metal lead and ITO lead.

6. The LCD substrate of claim 1, wherein when applied with a voltage by the lead, the piezoelectric thin film deforms so that the LCD substrate is caused to deform.

7. The LCD substrate of claim 1, wherein the material of piezoelectric thin film is selected from the group consisting of piezoelectric crystal, piezoelectric ceramic and organic piezoelectric material.

8. The LCD substrate of claim 2, wherein the piezoelectric thin films are symmetrically disposed in parallel to each other on the opposite sides of the at least one pattern region.

9. The LCD substrate of claim 2, comprising a plurality of pattern regions, wherein the piezoelectric thin films are in a strip shape and arranged between two pattern regions and outside of all patter regions, and the piezoelectric thin films on opposite sides of each of the pattern regions are symmetrically disposed in parallel to each other.

10. The LCD substrate of claim 9, wherein one piezoelectric thin film of a stripe shape is disposed between two pattern regions.

11. The LCD substrate of claim 10, wherein the lead connected to each end of the piezoelectric thin film extends to the periphery of the LCD substrate.

12. The LCD substrate of claim 9, wherein two piezoelectric thin films of a stripe shape are disposed in parallel between two pattern regions.

13. The LCD substrate of claim 12, wherein the lead connected to each end of the piezoelectric thin film is connected to a control circuit in one of the pattern regions.

* * * * *